Patented Oct. 22, 1929

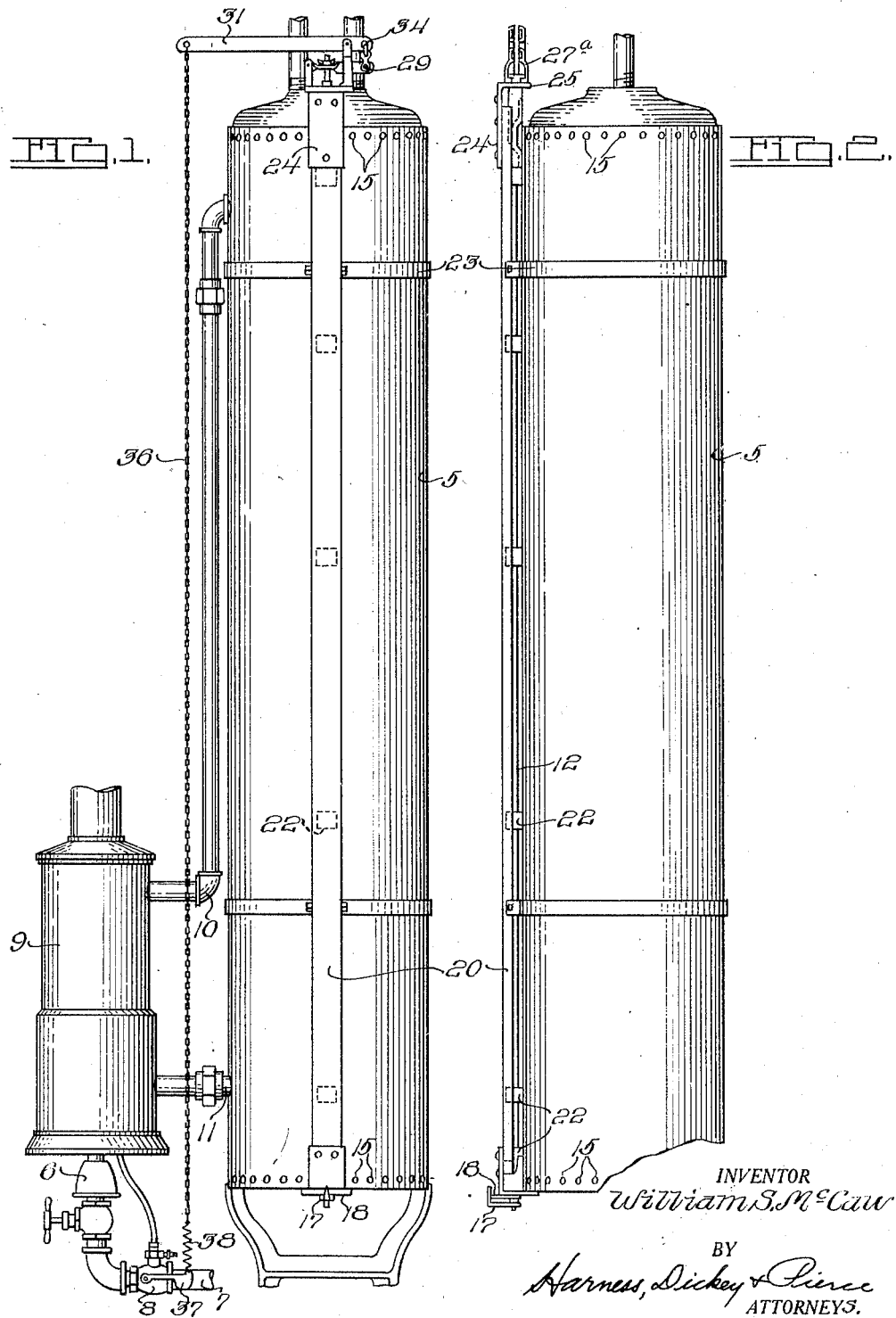

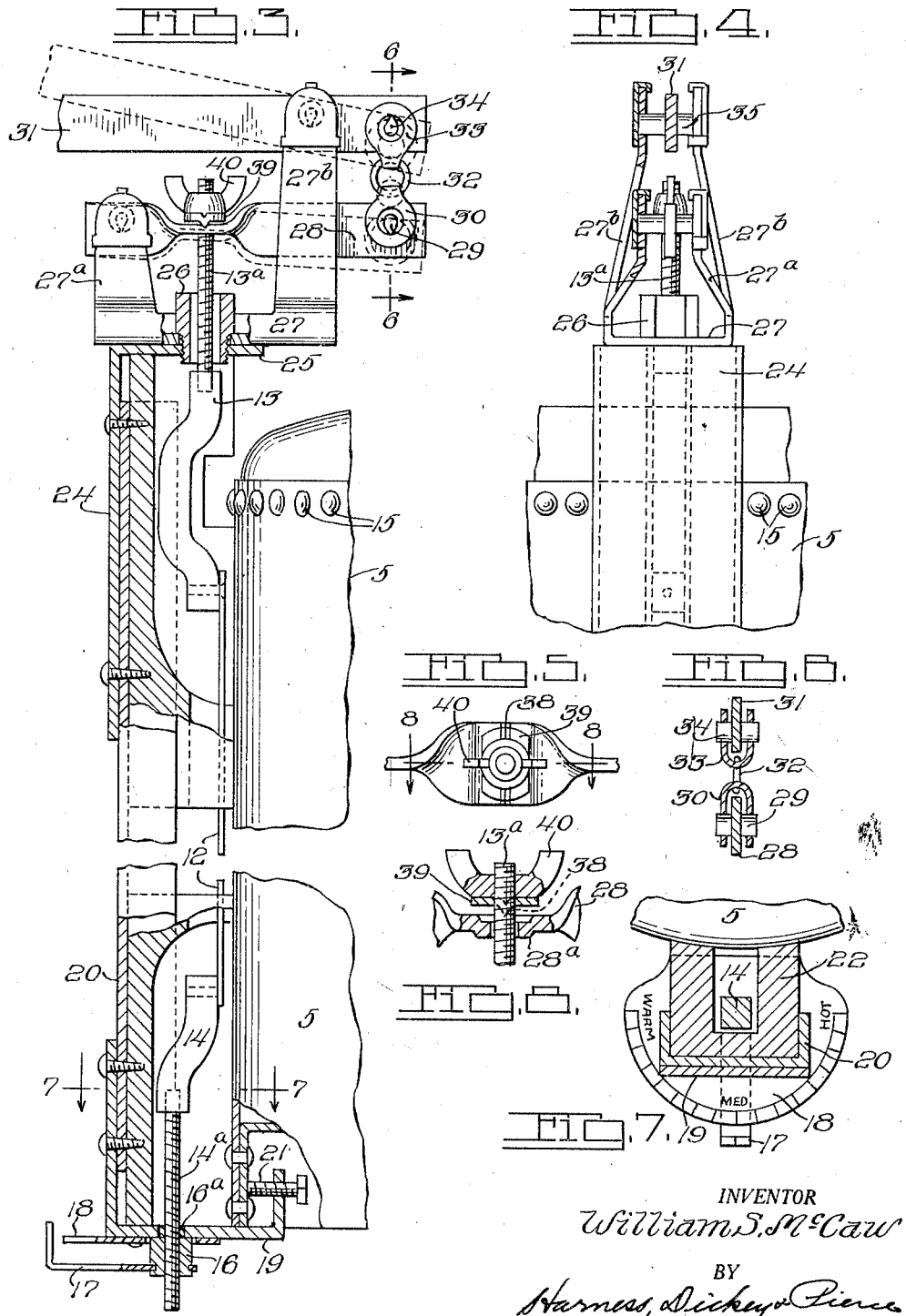

1,732,565

UNITED STATES PATENT OFFICE

WILLIAM S. McCAW, OF TOLEDO, OHIO, ASSIGNOR OF ONE-HALF TO WILLIAM E. BROER, OF TOLEDO, OHIO

AUTOMATIC HEAT REGULATOR

Application filed January 31, 1929. Serial No. 336,369.

This invention relates to automatic heat regulators and in particular to thermostatically controlled heat regulators for automatically maintaining a reservoir of water, or other liquid, within predetermined temperatures.

One of the objects of the present invention is the provision of a single metallic ribbon, or the like, in close proximity to the reservoir, the heat of whose contents is to be regulated, with connections at the ends of the ribbon whereby ready adjustments may be made for initially arranging the position of the ribbon and for exerting a desired pull by the ribbon on the leverage system connecting the ribbon with the heating apparatus.

A further object of the invention is the arrangement of simple adjusting means on the heat regulator whereby a relatively small movement of an index member with relation to a graduated dial will suffice to effect a marked change in the controlled temperature of the liquid in the controlled reservoir.

A further object of the invention is the provision of simple and effective means for connecting the thermostatic ribbon with the leverage system of my improved regulator, whereby the pull of the ribbon upon the leverage system will always be exerted at the same place regardless of the angular positions of the levers or the adjustments of the ribbon relatively to the levers.

The above and other objects will be apparent from the following description, wherein reference is made to the accompanying drawings, illustrating a preferred embodiment of my invention and wherein similar reference numerals designate similar parts throughout the several views.

In the drawings:

Fig. 1 is a front elevation of my improved regulator mounted upon a hot water reservoir such as is ordinarily used in dwellings.

Fig. 2 is a side elevation thereof.

Fig. 3 is an enlarged central section, with parts broken away, through the thermostatic portion of the regulator and connected levers.

Fig. 4 is an edge view of the upper portion of the thermostatic regulator and associated levers, looking from the left in Fig. 3, and with the fulcrum mountings for the levers broken away and shown in section for clearer illustration.

Fig. 5 is a detail plan view of the connection between the thermostatic ribbon and the leverage system.

Fig. 6 is a vertical section taken substantially on the line 6—6 of Fig. 3.

Fig. 7 is a horizontal section taken substantially on the line 7—7 of Fig. 3, and Fig. 8 is a detailed vertical section taken substantially on the line 8—8 of Fig. 5.

Referring now to the drawings the numeral 5 designates a hot water reservoir of any desired size and contour adapted to contain the water to be heated by a burner 6, adapted to burn liquid or gaseous fuel supplied through an inlet pipe 7 in which is arranged a valve 8, which valve is adapted to be automatically opened or closed by means of my improved heat regulator to control the admission of fuel to the burner 6. In Figure 1 I have illustrated a conventional gas heater 9 in which is preferably arranged a coil or the like, through which the water to be heated circulates above the burner 6, the extremities of the coil being connected by the pipes 10 and 11 respectively, with the upper and lower portions of the reservoir 5. It will be understood, however, that any desired form of heater may be utilized and that the construction of the heater forms no part of the present invention.

A thermostatically controlled heat regulator is secured upon the reservoir 5 and mounted so that the heat-responsive element thereof is in close proximity to the reservoir. As best shown in Figures 1–3 the heat-responsive element comprises a ribbon 12, or the like, of metal, or a combination of metals, suitable for comparatively rapid expansion and contraction when subjected to varying degrees of heat. The ribbon 12 is mounted so that it contacts or is in close proximity to the exterior of the reservoir 5, throughout substantially its entire length, and the extremities of the ribbon are secured to metallic end pieces 13 and 14 respectively, which carry threaded bolts 13ª and 14ª for adjustment purposes. The end pieces 13 and 14 are preferably shaped to bridge over the usual rows of rivets 15 at the upper and lower extremities of a hot water reservoir, as best shown in Figure 3. The lower end piece 14 has its adjusting screw 14ª threaded into a shouldered nut 16 carrying an index lever 17, the index portion of which swings in proximity to a graduated edge of a dial 18 secured to the bracket 19 supporting the lower extremity of the frame 20 arranged about the ribbon 12, as hereinafter pointed out. The shoulder of the nut 16 engages against the lower face of the bracket 19, and an upwardly extending neck 16ª of the nut is journaled in an aperture in the bracket 19, whereby the nut 16 is free to rotate, but is held against upward movement and so provides an abutment for the mounting of the ribbon 12 and associated parts. If desired the bracket 19 may be secured to the lower portion of the reservoir 5 by set screws 21, or the bracket may be maintained in position solely by the supports which hold the frame 20 upon the reservoir.

Covering the ribbon 12 so as to prevent accidental contact therewith and yet not prevent passage of air thereover is a preferably U-shaped frame 20, of sheet metal or the like, the frame being spaced from the reservoir 5 by a plurality of grooved insulators 22 bridging over the ribbon 12 so as not to restrict the contraction and expansion of the ribbon 12 during the use of my improved regulator. Any desired means of mounting the frame 20 upon the reservoir may be employed, and in Figures 1 and 2 I have shown a pair of clamps 23 for such purpose. To the upper extremity of the frame 20 is secured a bracket 24 having a horizontal top plate 25 provided with a threaded opening of greater diameter than the bolt 13ª of the upper end piece 13 of the ribbon 12 (note Figure 3). In the aperture of the top plate 25 is threaded a shouldered nut 26 having a central passage therethrough of greater diameter than the bolt 13ª and arranged with its shoulder engaging the upper surface of a bracket 27 carrying the fulcrum mountings for the leverage system of my improved regulator, whereby the nut 26 will serve to clamp the bracket 27 firmly upon the bracket 24 whenever the nut is turned down to a sufficient extent, but whenever the nut 26 is loosened the bracket 27 may be swung upon the bracket 24 through any desired angle to enable ready positioning of the fulcrum mountings so as to permit the extension of the levers in any desired direction from the frame 20 of the regulator. Then when the nut 26 is again turned down the shoulder thereof will clamp the bracket 27 in its adjusted position.

The leverage system herein shown comprises a comparatively short lower lever 28 fulcrumed adjacent one extremity within apertures in the upper extremities of the upwardly extending bracket arms 27ª of the bracket 27. Intermediate its ends the lower lever 28 is connected with the metallic ribbon 12, and adjacent its free extremity is provided with a downwardly pointing pivot 29 engaging a link 30, whence the movements of the lever 28 are communicated to a relatively long upper lever 31, as by means of an intermediate link 32 connecting the link 30 with a similar link 33, resting upon the upwardly pointing pivot 34 fixed in the lever 31 adjacent one end thereof. The long lever 31 is fulcrumed intermediate its ends upon a fulcrum pivot 35 engaging spaced apertures in the upwardly extending bracket arms 27ᵇ of the bracket 27 and adjacent its opposite extremity the long lever 31 is connected with a chain 36, or other suitable means, for connecting the lever with the valve-operating means for controlling the admission of fuel to the burner 6. Obviously any desired multiplication may be secured in my leverage system by suitably arranging the pivots and connections thereof, and it is to be understood that the illustrated embodiment is intended only for purposes of exemplification. The flexible member 36 is suspended from the long lever 31 in a substantially plumb line, the free extremity of the lever 31 being positioned so that it is substantially directly above the free extremity of an operating arm 37 of the valve 8. The lower extremity of the flexible member 36 carries a light coil spring 38 to the lower extremity of which is suspended the weighted operating arm 37 of the valve. The arm 37 is normally overweighted so that when no pull is exerted thereon it will close the valve 8 so as to prevent admission of the fuel to the burner 6. My improved regulator tends to swing the valve arm 37 upwardly to the extent desired whenever heat is to be supplied to the water within the reservoir 5, and then when the water in the reservoir is heated to the desired temperature the expansion of the ribbon 12 will serve to relieve the pull upon the valve arm 37, permitting it to fall of its own weight to close the valve.

The connection between the metallic ribbon 12 and the leverage system is a most important part of my improved regulator, for the ribbon remains in substantially the same vertical line regardless of the adjustment of the levers through various angular movements to enable the positioning of the free end of the long lever 31 directly over the valve arm 37. Obviously, different dwellings have the heaters 9 located variously with relation to the reservoirs 5 associated with such heaters, and it has been found necessary in practice to vary the angular position of the bracket 27 in practically every installation, while the length of the lever 31 must in many instances be changed to enable proper mounting of the flexible member 36 in plumb line relation to the valve operating arm. Moreover, it is desirable to always exert the pull of the ribbon 12 upon the leverage system at precisely the same point regardless of the angular changes in position of the levers and their supporting bracket. I have accomplished this by the connecting means best shown in Figs. 3, 5 and 8, wherein the lower lever 28 is formed with a substantially horizontal portion directly above the nut 26, and such horizontal portion is strengthened by depressing its central portion, substantially as shown at 28$^a$ in Fig. 8. At the sides of the depressed portion 28$^a$ the horizontal portion of the lever 28 is provided with aligned notches for the reception of substantially V-shaped pivots 38 extending downwardly from a pivot member 39 and held within such notches by means of an adjusting nut 40 threaded upon the upper extremity of the bolt 13$^a$ (note Figure 3). The depressed portion 28$^a$ of the lever 28, as well as the pivot member 39, are centrally apertured to encircle the bolt 13$^a$ without contacting the bolt, the sole engagement between the metallic ribbon 12 and the leverage system being through the pivots 38 and receiving notches in the horizontal portion of the lower lever. This connection is a simple and practical one, enabling the formation of the levers and connecting members by machine tools and also permitting comparatively quick initial adjustment of the metallic ribbon relatively to the levers during installation of my improved regulator.

In operation my improved regulator acts to maintain the valve 8 at the desired position to admit just enough gas to the burners 6 to first heat the water in the reservoir 5 to a desired temperature and then maintain the water at approximately such temperature. At its installation the regulator is mounted upon the reservoir 5 with its ribbon 12 in close proximity to the reservoir and with the free end of its long lever 31 substantially directly above the operating arm 37 of the valve 8 of the burner. Such positioning of the long lever 31 may be readily secured by swinging the supporting bracket 27 through the desired arc and then clamping the bracket upon the frame of the regulator by turning down the shouldered nut 26. As best shown in Figures 3 and 4 the head of the nut 26 extends above the sides of the bracket 27 and between the bracket arms 27$^a$ and 27$^b$ so that a tool may be readily inserted from either side of the bracket to appropriately turn the nut 26. After the bracket 27 has been mounted at the desired angle the initial adjustment of the ribbon 12 and its end pieces is made. The lower nut 16 is threaded to an intermediate portion of the lower bolt 14$^a$, whereupon the upper bolt 13$^a$ is extended through the aperture in a horizontal portion in the lower lever 28, and the apertured pivot member 39, and the thumb nut 40 threaded thereon until it forces the pivot member 39 into engagement with the lever 28, care being taken to insure the fitting of the pivots 38 of the member 39 within the notches of the lever 28. Further turning down of the thumb nut 40 will serve to first straighten and draw taut the ribbon 12, and then to exert a downward pressure upon the lower lever 28, which, of course, is communicated through the upper lever 31 to the valve-operating arm 37, tending to lift said arm from its closed position due to the overweighted structure of such arm. This initial adjustment of the position of the operating arm 37 may be continued to any desired extent, but in the majority of cases the initial adjustment is made so that the valve 8 will be normally maintained open to a sufficient extent to maintain the water in the reservoir 5 at a medium temperature, as for example 150° F. Sometimes it is necessary to readjust by turning the thumb nut 40 after the water in the reservoir has been heated to the normally desired temperature, and if desired this can readily be done. During such initial adjustment the index member 17 attached to the lower nut 16 is preferably left at an intermediate position relatively to the dial 18, though this is not essential. After the desired initial adjustment has been made, the water will continue to heat from the burner 8 until it has reached approximately the temperature desired, when the thermostatic expansion of the ribbon 12 will serve to release to some extent the pull exerted by the ribbon upon the lower lever 28, which in turn permits the falling of the overweighted valve arm 37 toward closing position. When some of the water is withdrawn from the reservoir, cold water, as from the supply pipe of the usual city water main, enters the reservoir and so reduces the temperature of the water then contained therein. The lowering of the temperature in the tank will serve to thermostatically contract the ribbon 12 and so swing the free end of the lower lever 28 downwardly, which movement is transmitted through the upper lever 31 to lift the operating arm 37 of the valve 8 and so admit more fuel to the burner 6 to quickly raise the temperature in the tank 5. As the temperature of the water in the tank again approaches the desired temperature the metallic ribbon will again expand and slacken the flexible member 36 to again enable the overweighted valve arm 37 to swing toward closed position.

When a different temperature is desired for the water in the tank 5 the pointer 17 may be swung through a desired arc to bring it into registration with the indication on the dial 18 marked with the desired temperature. The movement of the pointer 17 will turn the lower adjusting nut 16 upon the bolt 14$^a$, but since the shoulder of the nut 16 prevents it from moving upwardly upon the bolt the result will be that the bolt 14$^a$ will be moved downwardly, exerting a pull directly on the metallic ribbon 12 and through it to the leverage system and the operating arm 37, tending to lift the operating arm and render it necessary for the metallic ribbon 12 to expand to a greater degree before the operating arm may again return to its normal closed position.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, what I claim is:

1. The combination with a reservoir adapted to contain heated liquid, a burner arranged to supply heat to the liquid, and a valve for controlling the admission of fuel to the burner, of means for controlling the valve comprising a valve operating arm, a leverage system mounted adjacent the tank, a connection between the leverage system and the valve operating arm, a metallic ribbon arranged in close proximity to the reservoir, an adjustable connection between one extremity of the ribbon and the leverage system, and an adjustable anchoring connection at the opposite extremity of the ribbon.

2. The combination with a reservoir adapted to contain heated liquid, a burner arranged to supply heat to the liquid, and a valve for controlling the admission of fuel to the burner, of means for controlling the valve comprising a valve operating arm, a leverage system mounted adjacent the tank, a connection between the leverage system and the valve operating arm, a metallic ribbon arranged in close proximity to the reservoir, an adjustable connection between one extremity of the ribbon and the leverage system, an adjustable anchoring connection at the opposite extremity of the ribbon, one of said end adjustments for the ribbon being arranged with a movable pointer, and a graduated dial cooperating therewith.

3. The combination with a reservoir adapted to contain heated liquid, a burner arranged to supply heat to the liquid, and a valve for controlling the admission of fuel to the burner, of means for controlling the valve comprising a valve operating arm, a leverage system mounted adjacent the tank, a connection between the leverage system and the valve operating arm, a metallic ribbon arranged in close proximity to the reservoir, an adjustable connection between one extremity of the ribbon and the leverage system, an adjustable anchoring connection at the opposite extremity of the ribbon, the lever system being rotatable in its entirety throughout a complete circle without effecting the connection between the leverage system and the metallic ribbon.

4. In a thermostatically controlled heat regulator for liquid reservoirs, a metallic ribbon member arranged in close proximity to the reservoir, means for anchoring the lower extremity of the ribbon member, a leverage system rotatably mounted directly above the ribbon, a connection between the upper extremity of the ribbon and the leverage system, and means for securing the leverage system in any adjusted position including a hollow clamping member through which the ribbon member passes.

5. In a thermostatically controlled heat regulator for liquid reservoirs, a metallic ribbon member arranged in close proximity to the reservoir, means for anchoring the lower extremity of the ribbon member, a leverage system rotatably mounted directly above the ribbon, a connection between the upper extremity of the ribbon and the leverage system, and means for securing the leverage system in any adjusted position, including an apertured nut through which the ribbon member passes.

6. In a thermostatically controlled heat regulator for liquid reservoirs, a metallic ribbon member arranged in close proximity to the reservoir, means for anchoring the lower extremity of the ribbon member, a bracket rotatably mounted adjacent the reservoir and carrying a leverage system, a connection between the upper extremity of the ribbon member and the leverage system, and means for securing the bracket in any adjusted position including a hollow clamping member through which the ribbon member passes.

7. In a thermostatically controlled heat regulator for liquid reservoirs, a metallic ribbon member arranged in close proximity to the reservoir, means for anchoring the lower extremity of the ribbon member, a leverage system mounted adjacent the reservoir, and a connection between the ribbon member and the leverage system comprising spaced notched bearings on the leverage system, separated by an aperture, a centrally apertured pivot member having spaced pivots resting in said bearings, the upper extremity of the ribbon member extending through the apertures in the bearing and pivot members, and an adjustable member secured upon the ribbon member and adapted to press the pivot member into engagement with the bearings.

8. In a thermostatically controlled heat regulator for liquid reservoirs, a metallic ribbon member arranged in close proximity to the reservor, means for anchoring the lower extremity of the ribbon member, a lever fulcrumed adjacent the reservoir and provided with an apertured horizontal portion having spaced bearings at opposite sides of the aperture, a centrally apertured pivot member engaging said bearings, the upper extremity of the ribbon member extending through the apertures in the lever and pivot member, and adjustable means mounted on the ribbon member and engaging the pivot member.

9. In a thermostatically controlled heat regulator for liquid reservoirs, a metallic ribbon member arranged in close proximity to the reservoir, means for anchoring the lower extremity of the ribbon member, a bracket having an apertured base rotatably mounted adjacent the reservoir, a lever fulcrumed upon the bracket and having an apertured substantially horizontal portion with bearings at opposite sides of the aperture, a centrally apertured pivot member engaging the bearing, the upper extremity of the ribbon member extending through the apertures in the bracket, lever and pivot member, adjusting means secured upon the ribbon member and engaging the pivot member, and means for securing the bracket in any adjusted position.

10. In a thermostatically controlled heat regulator for liquid reservoirs, a metallic ribbon member arranged in close proximity to the reservoir, means for anchoring the lower extremity of the ribbon member, a leverage system mounted adjacent the reservoir, a connection between the upper extremity of the ribbon member and the leverage system, a bolt carried by the ribbon member, a nut threaded on the bolt and mounted for rotation but held against vertical movement, a pointer secured to the nut, and a fixed dial arranged to cooperate with the pointer.

WILLIAM S. McCAW.